(12) United States Patent
Kawakami et al.

(10) Patent No.: US 6,883,934 B2
(45) Date of Patent: Apr. 26, 2005

(54) LIGHT SOURCE DEVICE, ILLUMINATION DEVICE LIQUID CRYSTAL DEVICE AND ELECTRONIC APPARATUS

(75) Inventors: Hisanori Kawakami, Suwa (JP); Kogo Endo, Suwa (JP)

(73) Assignee: Seiko Epson Corporation (JP)

( * ) Notice: Subject to any disclaimer, the term of this patent is extended or adjusted under 35 U.S.C. 154(b) by 41 days.

(21) Appl. No.: 09/904,177

(22) Filed: Jul. 12, 2001

(65) Prior Publication Data

US 2002/0048163 A1 Apr. 25, 2002

(30) Foreign Application Priority Data

Jul. 13, 2000 (JP) ........................................ 2000-212658

(51) Int. Cl.⁷ .............................................. F21K 27/00
(52) U.S. Cl. ........................... 362/261; 362/27; 362/31; 362/555; 362/561; 362/335; 362/326; 362/340; 349/65; 385/33
(58) Field of Search ........................ 362/261, 27, 555, 362/31, 561, 335, 339, 326, 340; 349/65; 385/33

(56) References Cited

U.S. PATENT DOCUMENTS

| | | | |
|---|---|---|---|
| 5,381,019 A | | 1/1995 | Sato |
| 5,579,134 A | * | 11/1996 | Lengyel ...................... 349/62 |
| 5,640,483 A | | 6/1997 | Lin |
| 5,806,955 A | | 9/1998 | Parkyn, Jr. et al. |
| 5,890,791 A | * | 4/1999 | Saito ............................ 362/31 |
| 6,034,750 A | | 3/2000 | Rai et al. |
| 6,220,741 B1 | * | 4/2001 | Kawachi et al. ............... 362/26 |
| 6,231,200 B1 | * | 5/2001 | Shinohara et al. ............ 362/26 |
| 6,250,777 B1 | * | 6/2001 | Aoyama ..................... 359/726 |
| 6,612,723 B1 | * | 9/2003 | Futhey et al. ............... 362/339 |

FOREIGN PATENT DOCUMENTS

| | | |
|---|---|---|
| DE | 601 876 C | 8/1934 |
| DE | 41 33 476 A | 4/1992 |
| EP | 1 008 802 A1 | 12/1999 |
| EP | 1 001 561 A2 | 5/2000 |
| JP | 334556 | 6/1987 |
| JP | 8-194222 | 7/1996 |
| JP | 9-211232 | 8/1997 |
| JP | 9-325399 | 12/1997 |
| JP | 2000-180851 | 6/2000 |
| JP | 2001 177156 | 6/2001 |

OTHER PUBLICATIONS

European Search Report, European Patent Application No. 01305799.7.

* cited by examiner

*Primary Examiner*—Stephen Husar
*Assistant Examiner*—Bertrand Zeade
(74) *Attorney, Agent, or Firm*—Harness, Dickey & Pierce, P.L.C.

(57) ABSTRACT

A light source device 41A, 41B or 41C comprising a lens 44A, 44B or 44C which receives light from a light emitting device 43 such as LED. The lens 44A is a lens having the property that the directivity of exiting light in the Y direction is higher than the directivity in the X direction perpendicular to the Y direction. Namely, the light emitted from the light emitting device 43 is condensed in a narrow angular range in the Y direction, and is scattered in a wide angular range in the X direction. When the light source device 41A is used as a light source of an illumination device of a liquid crystal device, the height direction of a light guide in which the dimension is small coincides with the Y direction, and the width direction of the light guide in which the dimension is large coincides with the X direction.

20 Claims, 12 Drawing Sheets

LIGHT SOURCE DEVICE, ILLUMINATION DEVICE LIQUID CRYSTAL DEVICE AND ELECTRONIC APPARATUS

BACKGROUND OF THE INVENTION

1. Technical Field of the Invention

The present invention relates to a light source device using a light emitting device such as LED (Light Emitting Diode) or the like, an illumination device using the light source device, a liquid crystal device using the illumination device, and an electronic apparatus using the liquid crystal device.

2. Description of the Related Art

Recently, liquid crystal devices have widely been used for electronic apparatuses such as a computer and a cell phone. The liquid crystal device generally comprises a liquid crystal sandwiched between a pair of substrates each comprising an electrode so that the orientation of the liquid crystal is controlled by applying a voltage between both electrodes to modulate light transmitted through the liquid crystal, to display an image.

On the basis of the system for supplying light to the liquid crystal, various known liquid crystal devices are distinguished into a reflective liquid crystal device having a structure in which external light is reflected by a reflector plate provided on the outer surface or the inner surface of one of both substrates, a transmissive liquid crystal device having a structure in which light is supplied to the liquid crystal in a planar manner by using an illumination device provided outside one of the substrates, and a transflective liquid crystal device which functions as a reflective type when external light is incident, and functions as a transmissive type when external light is insufficient.

As the illumination device used for the transmissive liquid crystal device, the transflective liquid crystal device, and the like, a conventional known illumination device has a structure comprising a light source device which emits light, and a light guide which broadens the light exiting from the light source device in a planar manner and causes the light to exit. As the light source device, a conventional known device has a structure in which light from a light emitting device such as LED or the like is emitted to the outside through a lens, as disclosed in, for example, Japanese Unexamined Patent Application Publication No. 62-105486. According to this publication, it is known that an aspherical lens is used as the lens.

However, the aspherical lens used in the light source device disclosed in Japanese Unexamined Patent Application Publication No. 62-105486 is nondirectional, i.e., it has no directivity in condensation of the light emitted from the light emitting device. In other words, it has the property that light can be condensed in any directions all round.

Although the non-directivity for condensation of light is a preferable property according to circumstances, it is an undesirable property according to circumstances. For example, like in the case in which light is desired to be supplied as much as possible to the light guide used in a liquid crystal device, when light is desired to be condensed in the height direction of the light guide, but not condensed in the width direction perpendicular to the height direction, the light source device having no directivity for condensation of light is unsatisfactory for effectively utilizing light.

The present invention has been achieved in consideration of the above problem, and a first object of the present invention is to provide a light source device capable of efficiently applying light to an object according to the shape of the object to which light is supplied.

A second object of the present invention is to enable incidence of light with high efficiency to a light guide in an illumination device comprising the light guide.

A third object of the present invention is to enable a bright display easy to see without changing the light emitting ability, i.e., power consumption, of a light source in a liquid crystal device in which light is supplied to a liquid crystal panel to perform a display.

A fourth object of the present invention is to provide an electronic apparatus capable of performing a bright display easy to see with low power consumption.

SUMMARY OF THE INVENTION

In order to achieve the first object, a light source device according to a first aspect of the present invention comprises a light emitting device, and a lens which receives the light emitted from the light emitting device, wherein the lens is a lens, for example, an aspherical lens, having the property that directivity of exiting light in one direction is higher than directivity in exiting light in the direction perpendicular to the one direction.

The light source device having this construction has, for example, such a structure as shown in FIG. 7(a), in which such measurement as shown in FIG. 12(b) performed for the light source device 21 shown in FIG. 7(a) exhibits such a directional property of exiting light as shown in FIG. 12(a). In FIG. 7(a), reference numeral 43 denotes the light emitting device, and reference numeral 44 denotes the lens.

In the measurement shown in FIG. 12(b), the receiving angle θ of a light receiving device 73 with respect to the light emitting device 43 is successively changed from 0° to 90°, and luminous intensity is measured by the light receiving device 73 at each angle. In FIG. 12(a), the relative luminous intensity is shown on the ordinate, and the angle of light emission is shown on the abscissa. In FIG. 12(a), a curve X shows the directional property of exiting light in the transverse direction X of the light source device 21 shown in FIG. 7(a), and a curve Y shows the directional property of exiting light in the longitudinal direction Y perpendicular to the transverse direction X.

For example, as shown in FIG. 12(a), exiting light of the light source device of the present invention has no directivity in one direction X, and strong directivity in the direction Y perpendicular to the direction X. Namely, light is scattered at any angle all around in the X direction, but strong light is emitted in a narrow limited range in the Y direction. Therefore, the X direction and Y direction can be set appropriately according to the shape of an object to which light is supplied, to suppress ineffective travel of light to a portion other than the object, thereby permitting efficient incidence of light on the object.

In order to achieve the first object, a light source device according to a second aspect of the present invention comprises a light emitting device, and a lens which receives the light emitted from the light emitting device, wherein the lens has a planar light incidence plane and a non-planar light exiting plane having a shape in which the height from the light incidence plane changes in one direction, while the height is constant in the direction perpendicular to the one direction.

In the light source device having this construction, for example, as shown in FIG. 7(a), a light incidence plane 44d of a lens 44A is formed in a planar shape, and a light exiting plane 44e is formed in a non-planar shape. The light exiting plane 44e is formed in a shape in which the height from the light incidence plane 44d is constant at any point in one direction X, and the height from the light incident plane 44e changes with the points in the perpendicular direction Y. In the case shown in FIG. 7(a), the light exiting plane 44e is formed in a shape having a circular-arc section.

For example, when the lens is formed in the shape shown by reference numeral 44A in FIG. 7(a), light emitted from the light emitting device 43 can be scattered all around without directivity in the X direction, while the light can be emitted in the Y direction with directivity according to the change in the shape of the light exiting plane 44e. Therefore, the X direction and Y direction can be set appropriately according to the shape of an object to which light is supplied, to suppress ineffective travel of light to a portion other than the object, thereby permitting efficient incidence of light on the object.

In each of the light source devices according to the first and second aspects, the lens can be formed in, for example, the semicircular pillar shape shown by reference numeral 44A in FIG. 7(a), the prismatic shape shown by reference numeral 44B in FIG. 7(b), or the partial circular pillar shape having a Fresnel lens surface as shown by reference numeral 44C in FIG. 7(c).

In order to achieve the second object, an illumination device according to a first aspect of the present invention comprises a light source device which emits light, and a light guide which receives light from the light source device by a light receiving plane and causes light to exit from a light exiting plane, wherein the light source device comprises a light emitting device and a lens which receives the light emitted from the light emitting device, wherein the lens is a lens having the property that directivity of exiting light in one direction is higher than directivity of exiting light in the direction perpendicular to the one direction, the one direction in which the exiting light has higher directivity being set to the height direction of the light guide, and the perpendicular direction in which the exiting light has lower directivity being set to the width direction of the light guide.

In this illumination device, the directivity of the light exiting from the light source device is set to be high in the height direction in which the dimension of the light receiving plane of the light guide is small, and thus the light from the light source device can be incident on the light guide as much as possible, thereby improving the efficiency of incidence of light on the light guide. Also, the directivity of the exiting light is set to be low in the width direction in which the dimension of the light receiving plane of the light guide is large, and thus uniformity of luminous intensity can be achieved.

In order to achieve the second object, an illumination device according to a second aspect of the present invention comprises a light source device which emits light, and a light guide which receives light from the light source device by a light receiving plane and causes light to exit from a light exiting plane, wherein the light source device comprises a light emitting device, and a lens which receives the light emitted from the light emitting device, wherein the lens has a planar light incidence plane and a non-planar light exiting plane having a shape in which the height from the light incidence plane changes in one direction, while the height is constant in the direction perpendicular to the one direction, the one direction being set to the height direction of the light guide, and the perpendicular direction being set to the width direction of the light guide.

In the illumination device, the shape of the light exiting plane of the lens changes in the height direction in which the dimension of the light receiving plane of the light guide is small, and the shape of the light exiting plane of the lens is kept constant in the width direction in which the dimension of the light receiving plane of the light guide is large. Therefore, a large quantity of light can be condensed and incident on the light guide in the height direction of the light receiving plane of the light guide to improve the efficiency of incidence of light on the light guide. Also, light can be scattered in the width direction of the light receiving plane of the light guide to achieve uniformity of luminous intensity.

In each of the illumination devices according to the first and second aspects, the lens can be formed in, for example, the semicircular pillar shape shown by reference numeral 44A in FIG. 7(a), the prismatic shape shown by reference numeral 44B in FIG. 7(b), or the partial circular pillar shape having a Fresnel lens surface as shown by reference numeral 44C in FIG. 7(c).

Furthermore, in each of the illumination devices according to the first and second aspects, the lens can be provided on the light source device side, and the lens can also be provided on the light receiving plane of the light guide. When it is desired to improve the efficiency of incidence of the light exiting from the light source device on the light guide, lenses are preferably provided on both the light source device side and the light guide side.

In order to achieve the third object, a liquid crystal device according to a first aspect of the present invention comprises a liquid crystal panel comprising a liquid crystal held between a pair of substrates, and an illumination device for supplying light to the liquid crystal panel, wherein the illumination device comprises a light source device which emits light, and a light guide which receives light from the light source device by a light receiving plane and causes light to exit from a light exiting plane, and the light source device comprises a light emitting device and a lens which receives the light emitted from the light emitting device, wherein the lens is a lens having the property that directivity of exiting light in one direction is higher than directivity of exiting light in the direction perpendicular to the one direction, the one direction in which the exiting light has higher directivity being set to the height direction of the light guide, and the perpendicular direction in which the exiting light has lower directivity being set to the width direction of the light guide.

In this illumination device used in the liquid crystal device, the directivity of the light exiting from the light source device is set to be high in the height direction in which the dimension of the light receiving plane of the light guide is small, and thus the light from the light source device can be incident on the light guide as much as possible, thereby improving the efficiency of incidence of light on the light guide. Also, the directivity of the exiting light is set to be low in the width direction in which the dimension of the light receiving plane of the light guide is large, and thus uniformity of luminous intensity can be achieved. As a result, in the liquid crystal device, a bright display easy to see can be performed without a change in the light emitting ability, i.e., a change in power consumption, of the light source.

In order to achieve the third object, a liquid crystal device according to a second aspect of the present invention comprises a liquid crystal panel comprising a liquid crystal held between a pair of substrates, and an illumination device for supplying light to the liquid crystal panel, wherein the illumination device comprises a light source device which emits light, and a light guide which receives light from the light source device by a light receiving plane and causes light to exit from a light exiting plane, and the light source device comprises a light emitting device, and a lens which receives the light emitted from the light emitting device, wherein the lens has a planar light incidence plane and a non-planar light exiting plane having a shape in which the height from the light incidence plane changes in one direction, while the height is constant in the direction perpendicular to the one direction, the one direction being set to the height direction of the light guide, and the perpendicular direction being set to the width direction of the light guide.

In the illumination device used in this liquid crystal device, the shape of the light exiting plane of the lens changes in the height direction in which the dimension of the light receiving plane of the light guide is small, and the shape of the light exiting plane of the lens is kept constant in the width direction in which the dimension of the light receiving plane of the light guide is large. Therefore, a large quantity of light can be condensed and incident on the light guide in the height direction of the light receiving plane of the light guide to improve the efficiency of incidence of light on the light guide. Also, light can be scattered in the width direction of the light receiving plane of the light guide to achieve uniformity of luminous intensity. As a result, in the liquid crystal device, a bright display easy to see can be performed without a change in the light emitting ability, i.e., a change in power consumption, of the light source.

In each of the liquid crystal devices according to the first and second aspects, the lens can be formed in, for example, the semicircular pillar shape shown by reference numeral 44A in FIG. 7(*a*), the prismatic shape shown by reference numeral 44B in FIG. 7(*b*), or the partial circular pillar shape having a Fresnel lens surface as shown by reference numeral 44C in FIG. 7(*c*).

Furthermore, in the illumination device as a component of each of the liquid crystal devices according to the first and second aspects, the lens can be provided on the light source device side, and the lens can also be provided on the light receiving plane of the light guide. When it is desired to improve the efficiency of incidence of the light exiting from the light source device on the light guide, lenses are preferably provided on both the light source device side and the light guide side. As a result, a bright display easy to see can be performed on the display plane of the liquid crystal device.

In order to achieve the fourth object, an electronic apparatus according to the present invention comprises a liquid crystal device for displaying an image such as a character, and a control circuit for controlling the operation of the liquid crystal device, wherein the liquid crystal device comprises the liquid crystal device according to first or second aspect of the present invention. The liquid crystal device used in the electronic apparatus is capable of performing a bright display easy to see on the display plane of the liquid crystal device without increasing the light emitting ability of the light source, and thus the electronic apparatus using the liquid crystal device can perform a bright display easy to see with low power consumption.

DETAILED DESCRIPTION OF THE PREFERRED EMBODIMENTS

Figure 1:
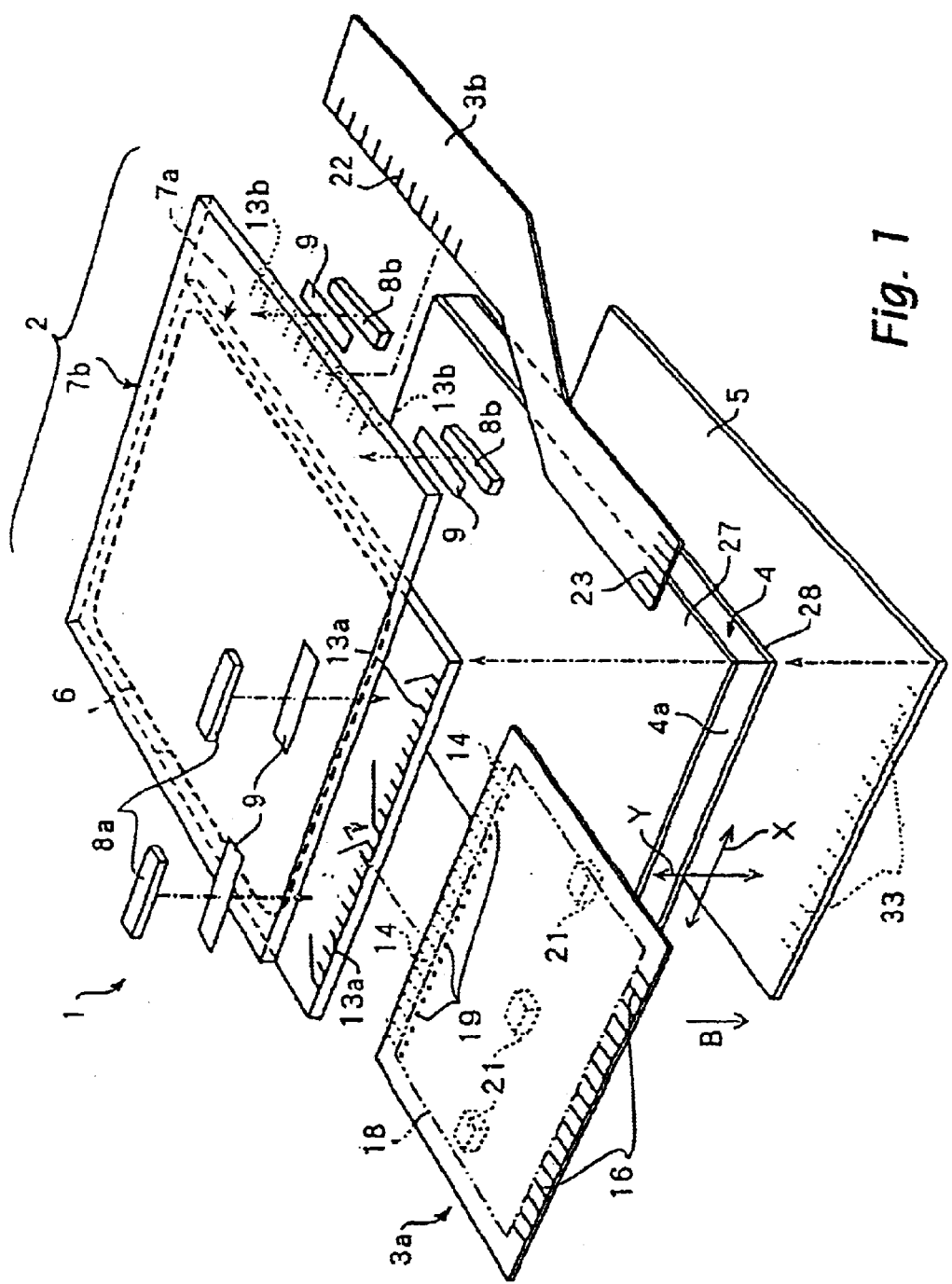
FIG. 1 is an exploded perspective view showing a light source device, an illumination device, and a liquid crystal device in accordance with an embodiment of the present invention.

FIG. 7(*a*) shows a light source device according to an embodiment of the present invention. The light source device 41A shown in the drawing comprises a light emitting device 43 provided on the surface of a base 42, and a lens 44A provided on the light emitting plane of the light emitting device 43. The lens 44A is formed in a semicircular pillar shape, i.e., a so-called semicylindrical shape. The base 42 and the lens 44 may be formed separately and then boded together, or may be formed integrally.

The light emitting device 43 comprises, for example, a LED (Light Emitting Diode). When it is desired to obtain white light from the light source device 41A, for example, a blue LED is used as the light emitting device 43, and a resin containing a YAG fluorescent material is provided on the light receiving plane of the blue LED. As a result, a part of the blue light emitted from the blue LED is applied to the YAG fluorescent material to be converted to yellow light (i.e., mixture of green light and red light) when passing through the resin, and the yellow light is mixed with the blue light emitted to the outside without being applied to the YAG fluorescent material to obtain white light.

The lens 44A has a planar incidence plane 44d and a non-planar exiting plane 44e having a shape in which the height from the light incidence plane 44d changes in one direction Y, for example, changes along an arch shape in this embodiment. The height from the incidence plane 44d is constant at any point in the X direction perpendicular to the Y direction.

Figure 12A:
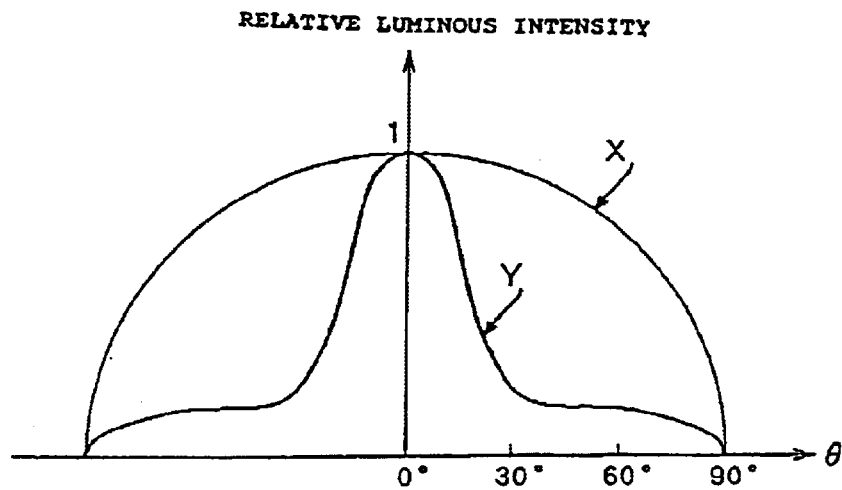
FIG. 12 is a drawing showing the directivity characteristics of exiting light of a light source device of the present invention, and the method of measuring the directivity characteristics.
Figure 12B:
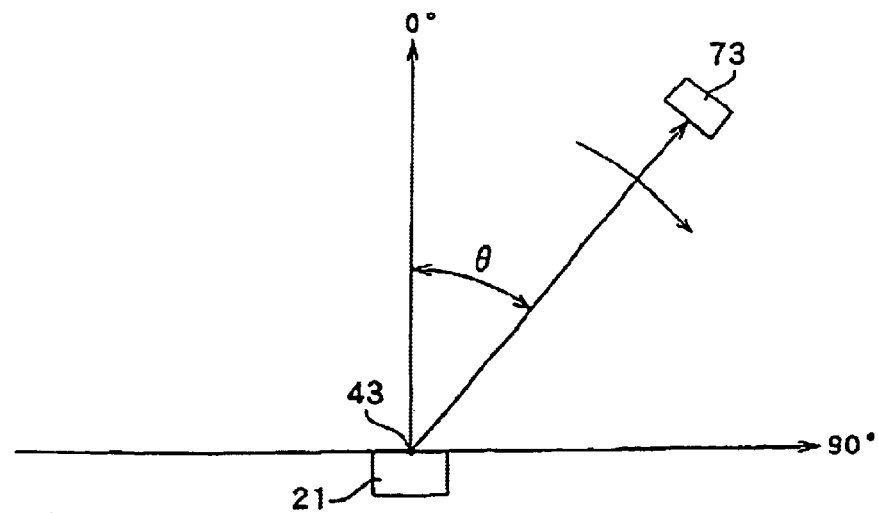

Since the light exiting plane of the lens 44A is formed in a semicylindrical shape as described above, exiting light has no directivity in the X direction, and high directivity in the Y direction. Namely, the lens 44A causes scattered light to exit in a wide angular range in the X direction, and causes condensed light with high intensity to exit in a limited narrow angular range in the Y direction. Such directivity characteristics of exiting light can be indicated by a graph of FIG. 12(*a*).

FIG. 7(*b*) shows a light source device according to another embodiment of the present invention. The light source device 41B shown in the drawing is different from the light source device 41A shown in FIG. 7(*a*) in that a pillar member having a prismatic shape, i.e., a triangular sectional shape, is used as a lens 44B. The same members as those shown in FIG. 7(*a*) are denoted by the same reference numerals, and a description thereof is omitted. In this embodiment, the base 42 and the lens 44B may be formed separately and then bonded together, or may be formed integrally.

The lens 44B has a planer incidence plane 44*d* and a non-planer exiting plane 44*e* having a shape in which the height from the light incidence plane 44*d* changes in one direction Y, for example, changes along a triangular sectional shape in this embodiment. The height from the incidence plane 44*d* is constant at any point in the X direction perpendicular to the Y direction.

Since the light exiting plane of the lens 44B is formed in a prismatic shape as described above, exiting light has no directivity in the X direction, and high directivity in the Y direction. Namely, the lens 44B causes scattered light to exit in a wide angular range in the X direction, and causes condensed light with high intensity to exit in a limited narrow angular range in a Y direction. Such directivity characteristics of exiting light can be indicated by a graph of FIG. 12(*a*).

FIG. 7(*c*) shows a light source device according to another embodiment of the present invention. The light source device 41C shown in the drawing is different from the light source device 41A shown in FIG. 7(*a*) in that a pillar member having a partial circular pillar shape having a Fresnel lens surface, is used as a lens 44C. The same member as those shown in FIG. 7(*a*) are denoted by the same reference numerals, and a description thereof is omitted. In this embodiment, the base 42 and the lens 44C may be formed separately and then bonded together, or may be formed integrally.

The lens 44C has a planar light incidence plane 44*d*, and a non-planar light exiting plane 44*e* having a shape in which the height from the light incidence plane 44*d* changes in one direction Y; in this embodiment, the height changes along a Fresnel lens shape. The height from the light incidence plane 44*d* is constant at any point in the X direction perpendicular to the Y direction.

The light exiting plane of the lens 44C is formed in the Fresnel lens shape, as described above, and thus exiting light has no directivity in the X direction, and high directivity in the Y direction. Namely, the lens 44C causes scattered light to exit in a wide angular range in the X direction, and causes condensed light with high intensity to exit in a limited narrow angular range in the Y direction. The directivity characteristics of exiting light can be indicated by, for example, a graph of FIG. 12(*a*).

On the basis of the driving system, liquid crystal devices are distinguished into an active matrix system liquid crystal device on a system in which pixel electrodes are driven by a switching element (i.e., a nonlinear element), and a passive matrix system liquid crystal device having a simple matrix arrangement without using switching elements. In comparison between both systems, the active matrix system is thought to be advantageous from the viewpoint of good contrast, responsiveness, etc., and ease of achievement of a high-definition display.

Systems known as the active matrix system liquid crystal device include a system using a three-terminal element such as a thin film transistor (TFT) or the like as a switching element, and a system using a two-terminal element such as a thin film diode (TFD). Of these systems, the liquid crystal device using TFD or the like has the advantages that no defective short-circuit occurs between wirings because there is no intersection of the wirings, and the deposition step and photolithography step can be shortened.

A description will now be made of the case in which the present invention is applied to an active matrix system liquid crystal device using TFD as a switching element for a pixel electrode in accordance with an embodiment of the present invention. A liquid crystal device according to an embodiment of the present invention is a transflective liquid crystal device which functions as a reflective type when external light is present, and functions as a transmissive type when external light is insufficient.

FIG. 1 shows a liquid crystal device 1 according to this embodiment. The liquid crystal device 1 comprises a liquid crystal panel 2 to which a FPC (Flexible Printed Circuit) 3*a* and FPC 3*b* are connected, and a light guide 4 mounted to the non-display side (the lower side shown in FIG. 1) of the liquid crystal panel 2. A control substrate 5 is provided on the side of the light guide 4 opposite to the liquid crystal panel 2 side thereof. The control substrate 5 is used as a component of the liquid crystal device, or a component of an electronic apparatus to which the liquid crystal device is mounted. In this embodiment, the FPCs 3*a* and 3*b* are used for electrically connecting the liquid crystal panel 2 and the control substrate 5.

The liquid crystal panel 2 comprises a pair of substrates 7*a* and 7*b* which are bonded together with a ring sealing material 6. Liquid crystal driving ICs 8*a* are mounted on the surface of the portion of the first substrate 7*a*, which projects from the second substrate 7*b*, by using AFC (Anisotropic Conductive Film). Liquid crystal driving ICs 8*b* are mounted on the surface of the portion of the second substrate 7*b*, which projects from the first substrate 7*a*, by using AFC (Anisotropic Conductive Film)9.

The liquid crystal device of this embodiment is an active matrix system liquid crystal device using TFDs as switching elements, in which one of the first and second substrates 7*a* and 7*b* is an element substrate, and the other is a counter substrate. In this embodiment, the first substrate 7*a* is considered as the element substrate, and the second substrate 7*b* is considered as the counter substrate.

Figure 2:
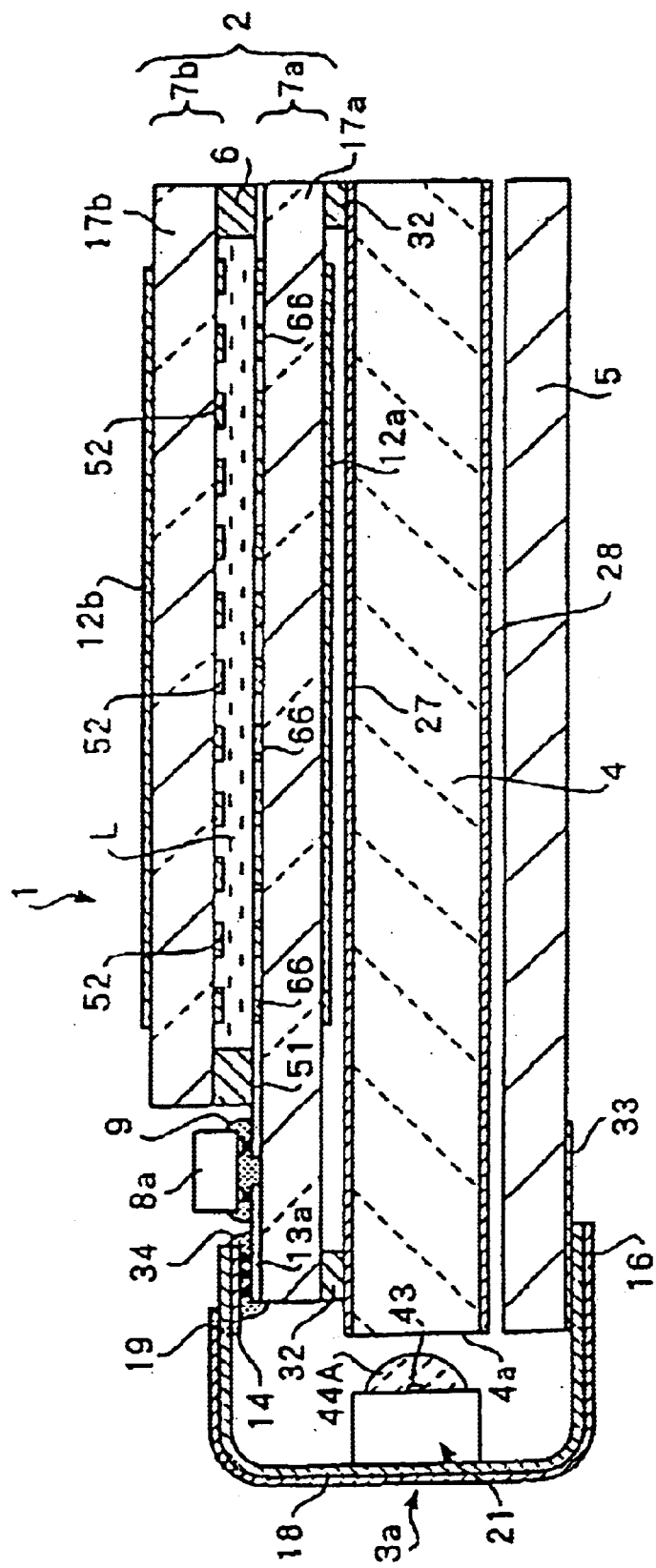
FIG. 2 is a sectional view showing the sectional structure of the liquid crystal device shown in FIG. 1

As shown in FIG. 2, pixel electrodes 66 are formed on the inner surface of the first substrate 7*a* serving as the element substrate, and a polarizer plate 12*a* is attached to the outer surface. In addition, data lines 52 are formed on the inner surface of the second substrate 7*a* serving as the counter substrate, and a polarizer plate 12*b* is attached to the outer surface thereof. A liquid crystal L is sealed in the gap surrounded by the first substrate 7*a*, the second substrate 7*b* and the sealing material 6, i.e., in the cell gap.

Although not shown in FIG. 2, various optical components other than the above are provided on the first substrate 7*a* and the second substrate 7*b* according to demand. For example, an alignment film is provided on the inner surface of each of the substrates, for aligning the orientation of the liquid crystal L. The alignment film is formed by coating a polyimide solution and then burning the coating. It is said that the polymer main chains of polyimide are oriented in a predetermined direction by rubbing so that the liquid crystal molecules of the liquid crystal L sealed in the cell gap are oriented in the orientation direction of the alignment film.

In a color display, color filters of the primary colors including R (red), G (green) and B (blue) are formed in a predetermined arrangement on the portions of the counter substrate, which are opposed to the pixel electrodes formed on the element substrate, and a black matrix of Bk (black) is formed in the regions not opposed to the pixel electrodes. Furthermore, a smoothing layer is coated for smoothing and protecting the surfaces of the color filters and the black matrix. A counter electrode provided on the counter substrate is formed on the smoothing layer.

Figure 3:
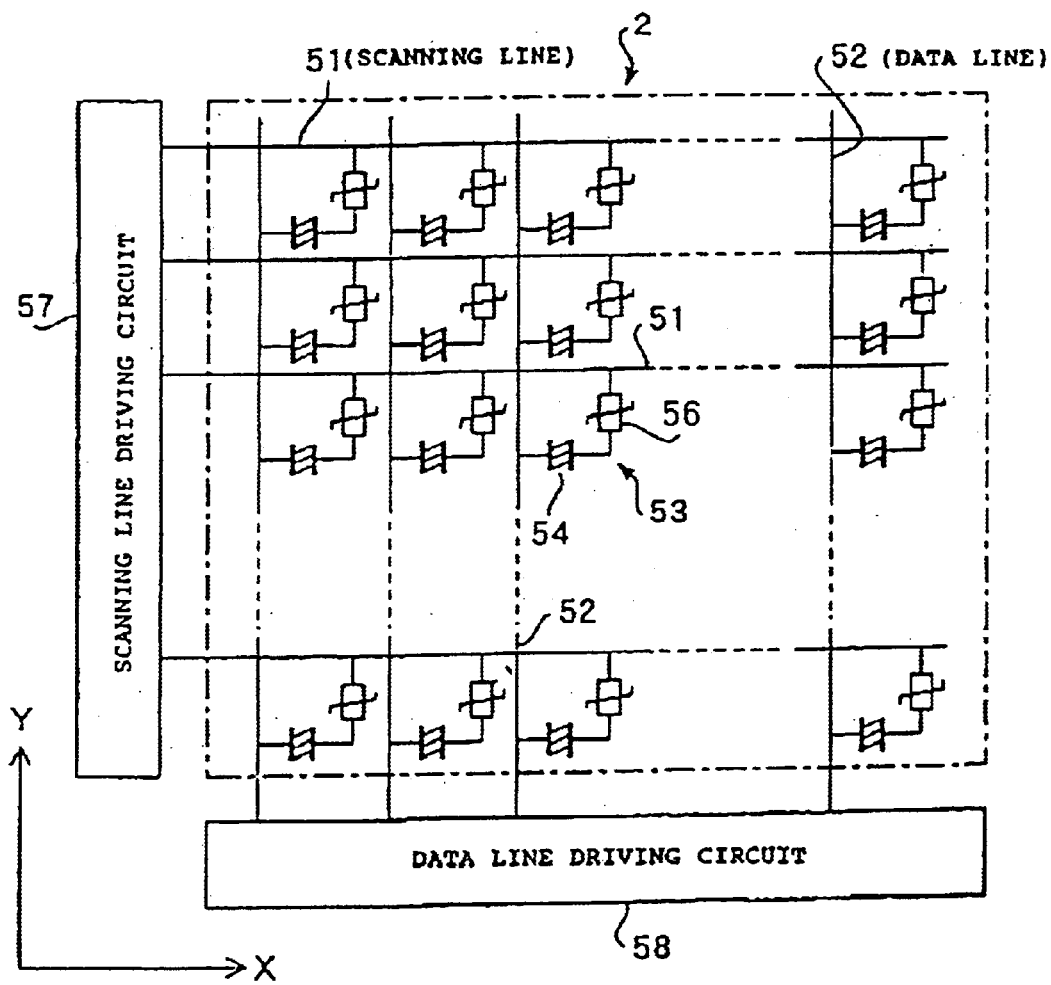
FIG. 3 is a drawing schematically showing the electrical configuration of a liquid crystal panel which constitutes the liquid crystal device shown in FIG. 1.

FIG. 3 schematically shows the electrical configuration of the liquid crystal panel 2. As shown in FIG. 3, in the liquid crystal panel 2, a plurality of scanning lines 51 are formed in the line direction (X direction), and a plurality of data lines 52 are formed in the column direction (Y direction), pixels 53 being formed at the intersections of the scanning lines 51 and the data lines 52. Each of the pixels 53 is formed by series connection of a liquid crystal layer 54 and a TFD (Thin Film Diode) 56.

The scanning lines 51 are driven by a scanning line driving circuit 57, and the data lines 52 are driven by a data line driving circuit 58. In this embodiment, the scanning line driving circuit 57 is included in the liquid crystal driving ICs 8a, and the data line driving circuit 58 is included in the liquid crystal deriving ICs 8b.

In FIG. 3, the scanning lines 51 and the TFDs 56 are formed on the inner side of the element substrate 7a shown in FIG. 2, and the pixel electrodes 66 formed on the inner surface of the element substrate 7a are connected to the scanning lines 51. On the other hand, in FIG. 3, the data lines 52 are formed as stripe electrodes on the inner surface of the counter substrate 7b shown in FIG. 2. The element substrate 7a and the counter substrate 7b are bonded together so that the pixel electrodes on one line and one data line 52 have an opposite positional relation. Therefore, the liquid crystal layer 54 comprises the data lines 52 and the pixel electrodes 66, and the liquid crystal L held therebetween.

The data lines 52 are made of, for example, a transparent conductive material such as ITO (Indium Tin Oxide). The pixel electrodes 66 are made of a reflecting material such as Al (aluminum). In FIG. 3, the TFDs 56 are connected to the scanning lines 51, and the liquid crystal layer 54 is connected to the data lines 52. However, conversely, the TFDs 56 may be connected to the data lines 52, and the liquid crystal layer 54 may be connected to the scanning lines 51.

Figure 4A:
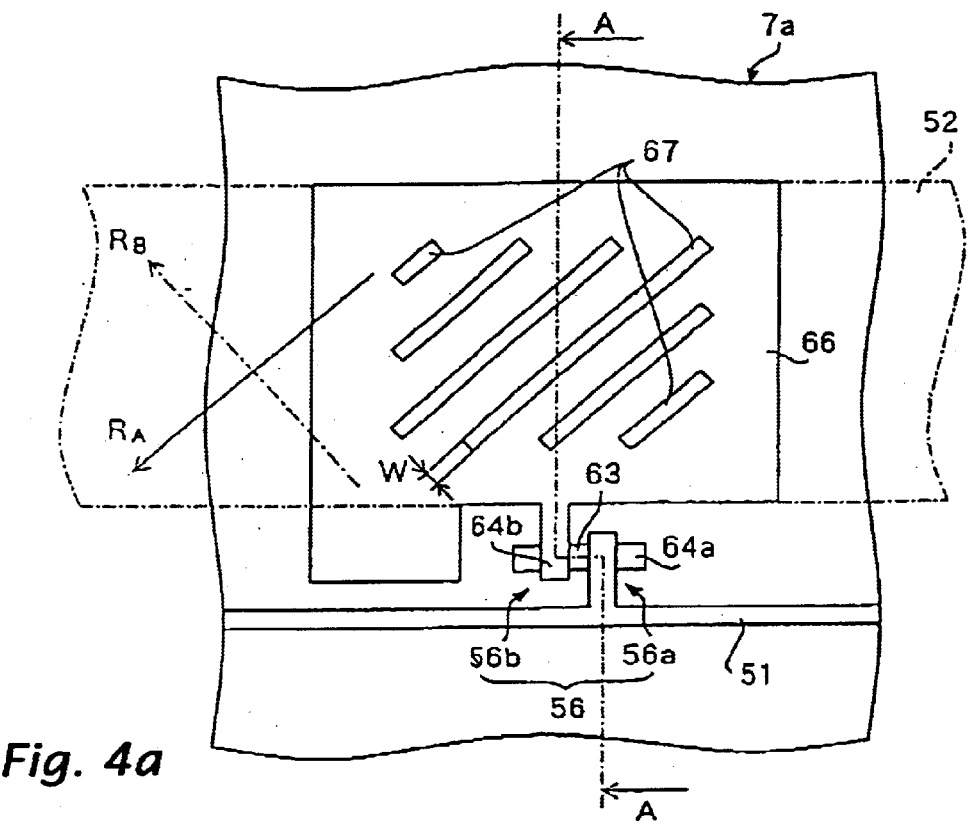
FIG. 4 is a drawing showing the structure of one pixel in the liquid crystal panel shown in FIG. 3, in which FIG. 3(*a*) is a plan view, and FIG. 3(*b*) is a sectional view taken along line A—A in FIG. 3(*a*).
Figure 4B:
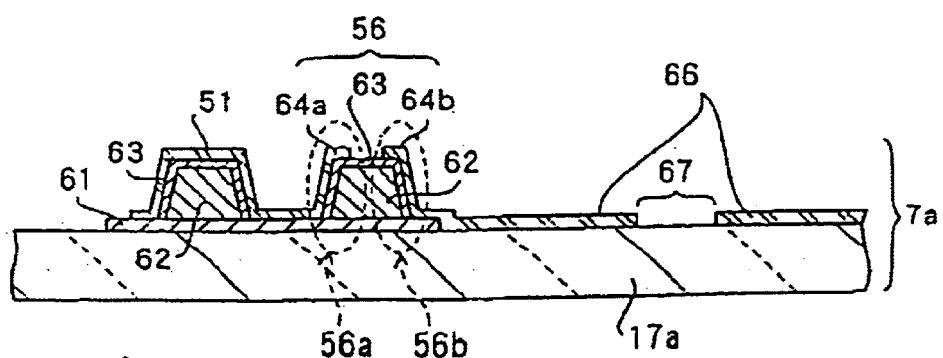

Next, FIG. 4 shows the construction of one pixel of the element substrate 7a. Particularly, FIG. 4(a) shows the planar structure of one pixel, and FIG. 4(b) shows the sectional structure taken along line A—A in FIG. 4(a). In these drawings, the TFT 56 comprises two TFD portions including a first TFD 56a and a second TFD 56b which are formed on an insulating film 61 deposited on the surface of the element substrate 7a. The insulating film 61 is formed to a thickness of about 50 to 200 mm by using tantalum oxide ($Ta_2O_5$).

The TFDs 56a and 56b comprise a first metal film 62, an oxide film 63 formed on the surface of the first metal film 62 to function as an insulator, and second metal films 64a and 64b, respectively, which are formed on the surface of the oxide film 63 to be spaced therebetween. The oxide film 63 comprises tantalum oxide ($Ta_2O_5$) formed by, for example, anodic oxidation of the surface of the first metal film 62. In anodic oxidation of the first metal film 62, the surfaces of the scanning lines 51 are also oxidized at the same time to form an oxide film composed of tantalum oxide.

As the thickness of the oxide film 63, a preferred value is selected according to applications, for example, about 10 to 35 nm. The thickness is a half of the thickness of the case in which one TFD is used for one pixel. Although the chemical solution used for anodic oxidation is not limited, for example, a 0.01 to 0.15 by weight citric acid aqueous solution can be used.

The second metal films 64a and 64b are formed by depositing a reflecting material such as Al (aluminum) by using a deposition technique such as sputtering, and then patterning the film by photolithography and etching processes to form the films having a final thickness of about 50 to 300 nm. The second metal film 64a is used as one scanning line 51, and the other second metal film 64b is connected to one pixel electrode 66.

The first TFD 56a has a laminated structure of the second metal film 64a/the oxide film 63/the first metal film 62, i.e., the sandwiched structure of metal/insulator/metal, in the order from the scanning line 51 side, and thus the current-voltage characteristic is nonlinear in both the positive and negative directions. On the other hand, the second TFD 56b comprises the first metal film 62/the oxide film 63/the second metal film 64b in the order from the scanning line 51 side, and thus has the current-voltage characteristic opposite to the first TFD 56a. Therefore, the TFD has a system in which two elements are oppositely connected in series, and the non-linearity of the current-voltage characteristic is symmetrized in both the positive and negative directions, as compared with the case in which one element is used.

The first metal film 62 is made of, for example, a tantalum single material or a tantalum alloy. As the thickness of the first metal film 62, a preferred value is selected according to the application of the TFD 56, and ordinarily about 100 to 500 nm. In use of a tantalum alloy for the first metal film 62, an element of the V to VIII groups in the periodic table, such as tungsten, chromium, molybdenum, rhenium, yttrium, or lanthanum dysprosium is added to the main component tantalum. In this case, tungsten is preferred as an additive element, and the content is preferably, for example, 0.1 to 6% by weight.

A base 17a which constitutes the element substrate 7a is made of, for example, quartz, glass, or plastic, together with a base 17b (refer to FIG. 2) which constitutes the counter substrate 7b. In a simple reflective type, the base 17a of the element substrate is not necessarily required, but like in this embodiment, when the liquid crystal device is used as both the reflective type and the transmissive type, it is essential that the element substrate base 17a is transparent.

The reasons for providing the insulating film 61 on the surface of the element substrate 7a are the following. First, the first metal film 62 is prevented from being separated from an underlying layer in heat treatment after deposition of the second metal films 64a and 64b. Secondary, diffusion of impurities into the first metal film 62 is prevented. Therefore, if these points do not matter, the insulating film 61 can be omitted.

The TFD 56 is an example of a two-terminal nonlinear element, and an element using a diode element structure, such as MSI (Metal Semi-Insulator), or these elements oppositely connected in series or in parallel can also be used.

Furthermore, when the current-voltage characteristics need not be strictly symmetrized in both the positive and negative directions, TFD comprising only one element may be used.

In FIG. 4, the pixel electrode 66 formed to extend from the second metal film 64b comprises a metal film of Al (aluminum) or the like having high reflectance. Also, as shown in FIG. 4(a), slit apertures 67 obliquely formed are provided in the pixel electrode 66. When the liquid crystal device of this embodiment functions as the transmissive type, light passing through the apertures 67 enter the liquid crystal layer 54 (refer to FIG. 3). The pixel electrode 66 preferably has micro protrusions so that reflected light is scattered.

In the liquid crystal panel 2 (refer to FIG. 1), the element substrate 7a and the counter substrate 7b are bonded together with a space kept constant therebetween, and the liquid crystal L (refer to FIG. 2) is sealed in the space. In consideration of the visual characteristics of the liquid crystal panel, the direction of rubbing for imparting orientation to the liquid crystal L is set to the direction shown by allow $R_A$ in FIG. 4 for the element substrate 7a, and set to the direction shown by arrow $R_B$ for the counter substrate 7b. Namely, the rubbing direction which determines the orientation direction of the liquid crystal molecules with no voltage applied is the upward direction $R_B$ inclined to the left at 45° for the counter substrate 7b on the front side as the bonded substrates are viewed from the counter substrate 7b side, and the rubbing direction is the downward direction $R_A$ inclined to the left at 45° for the element substrate 7a on the back side. Therefore, the slit direction of the apertures 67 formed in the element substrate 7a coincides with the rubbing direction $R_A$.

Since rubbing is generally performed by rubbing with a buff cloth wound on a roller in a predetermined direction, undesirable situations such as the occurrence of static electricity and the occurrence of dust particles easily occur in the manufacturing process. In this embodiment, the moving direction of the buff cloth in rubbing is caused to coincide with the slit direction of the apertures 67 to decrease the influence of steps formed by the pixel electrodes 66, thereby suppressing the occurrence of static electricity and various dust particles.

Although, in the above description, the composition of the second metal films 64a and 64b is the same as the pixel electrodes 66, the second metal films 64a and 64b may be formed by patterning a non-reflecting metal such as chromium, titanium, or molybdenum, and then the pixel electrodes 66 may be formed by patterning a reflecting metal such as Al.

Figure 5:
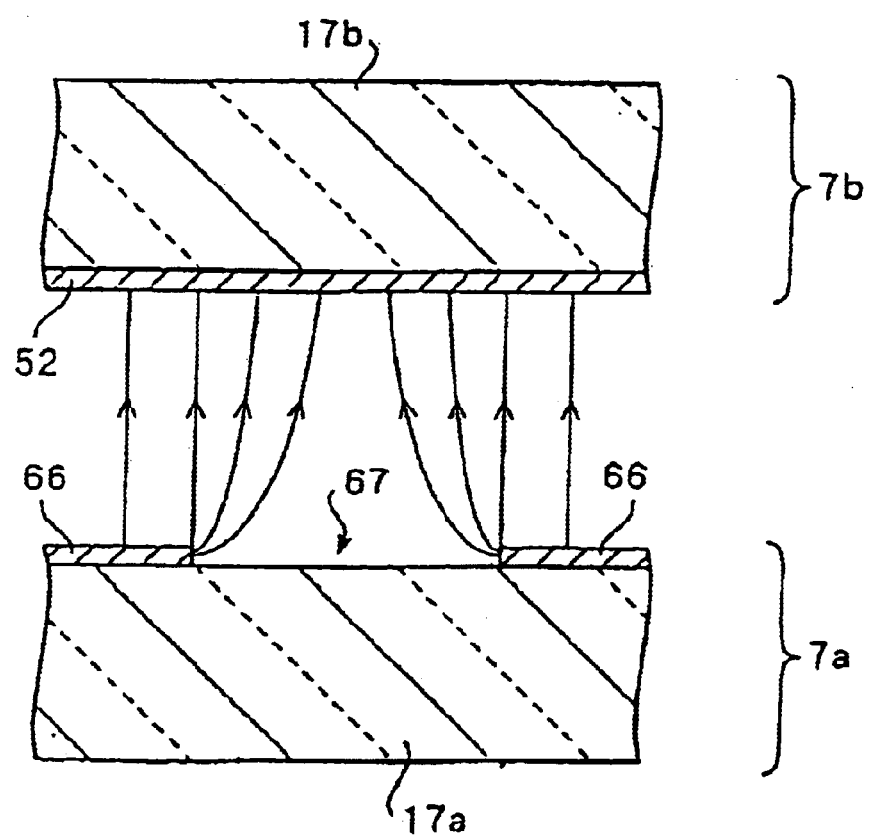
FIG. 5 is a sectional view showing the direction of an electric field in an element substrate.
Figure 6A:
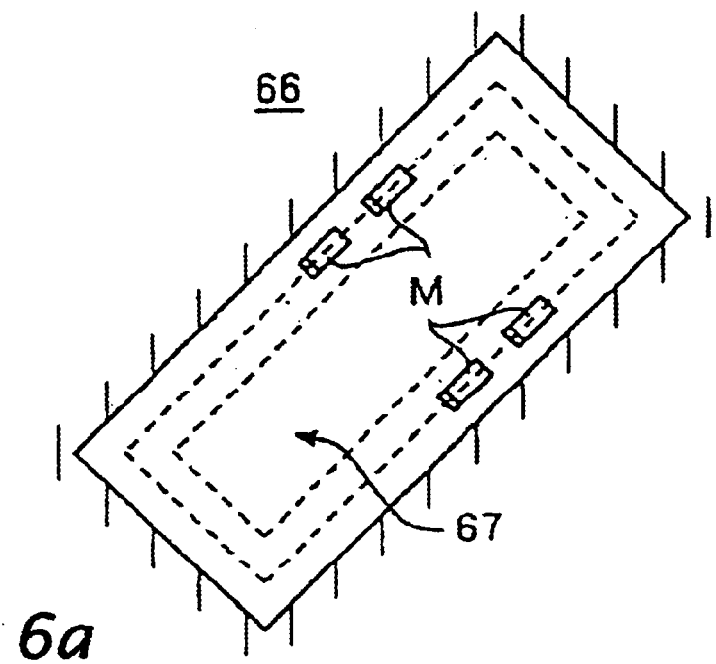
FIG. 6 is a drawing schematically showing the relation between the strength of an electric field in an element substrate and the arrangement of liquid crystal molecules.

As shown in FIG. 5, the direction of an electric field produced by one pixel electrode 66 and the corresponding data line 52 is perpendicular to both substrates in the regions other than the apertures 67, and thus the strength of the field is also uniform. However, the electrode is absent from the apertures 67, and thus an electric field occurs due to only a leakage from the aperture ends of the pixel electrodes 66. Therefore, the strength of the electric field near each of the apertures 67 gradually decreases as the distance from the aperture ends increases, and is thus not uniform. Conversely, this means that the strength of the electric field is substantially constant at points at equal distances from the side end of each of the apertures 67 formed in the pixel electrodes 66, i.e., at the points shown by broken lines in FIG. 6(a).

On the other hand, since the rubbing direction of the element substrate 7a having the pixel electrodes 66 formed thereon coincides with the slit direction of the apertures 67 formed in the pixel electrodes 66, and thus the liquid crystal molecules M on the element substrate 7a side are oriented in parallel with the side ends of the apertures 67 with no voltage applied. Therefore, when a potential difference occurs between the pixel electrodes 66 and the data lines 52, and particularly when the potential difference is small, the strength of the electric field at one end of each liquid crystal molecule M is equal to that at the other end thereof, and thus the liquid crystal molecules M located in the apertures 67 are tilted in the same manner as the liquid crystal molecules located in the regions where the electrodes are present, i.e., the regions which contribute to a display when the device functions as the reflective type. As a result, the rotatory direction of the light passing through the apertures 67 is substantially the same as that of the light reflected by the pixel electrodes 66, decreasing a difference in display quality between the transmissive type and the reflective type.

Although, as described above, the slit direction of the apertures 67 preferably coincides with the rubbing direction, the difference in display quality can be possibly decreased to a level with no practical problem even when the angle between the both directions is in the range of ±15°.

Figure 6B:
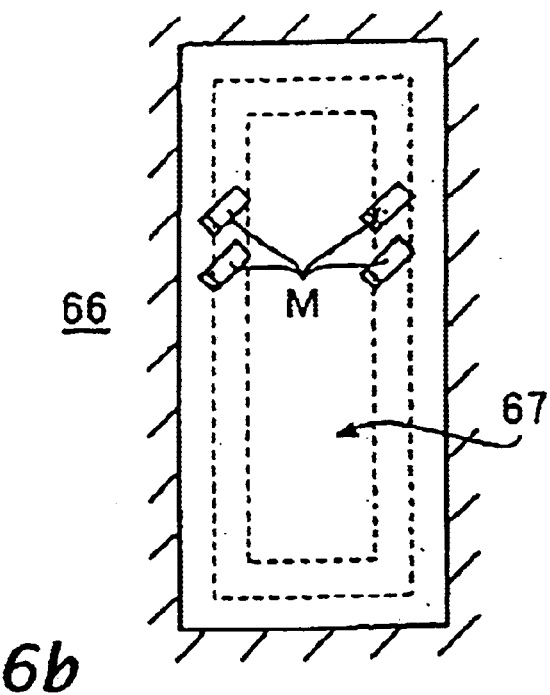

When the rubbing direction does not coincide with the slit direction of the apertures 67, as shown in FIG. 6(b), the liquid crystal molecules M located in the apertures 67 are oriented in the direction crossing the side ends of the apertures 67 with no voltage applied. Therefore, even when a potential difference occurs between the pixel electrodes 66 and the data lines 52, and particularly, when the potential difference is small, the strength of an electric field at one end of each liquid crystal molecule M is different from that at the other end thereof, and thus the liquid crystal molecules M located in the aperture 67 are tilted in a different manner from the liquid crystal molecules located in the regions which contribute to a display when the device functions as the reflective type. As a result, the rotatory direction of the light passing through the apertures 67 is different from the light reflected by the pixel electrodes 66, thereby causing a difference in display quality between the transmissive type and the reflective type.

Next, the width and area of the apertures 67 formed in the pixel electrodes 66 will be described. When the liquid crystal sealed between a pair of the substrates is a TN (Twisted Nematic) type, the distance between the substrate is generally several $\mu$m. In this case, for example, in a normally white display, even at a point at a distance of about 1.5 $\mu$m from the end of each of the intersections of the electrodes of both substrates, a black display is obtained by the influence of a leakage electric field from one end of the periphery of each electrode by applying a voltage. On the basis of this, when the width of the slit apertures 67 is about twice as large as 1.5 $\mu$m, i.e., 3 $\mu$m, or less, the liquid crystal molecules in the apertures 67 are tilted by a leakage electric field from the both ends of each aperture 67 in the same manner as the liquid crystal molecules in the regions where the electrode are present. Conversely, when the width W of the slit apertures 67 is 3 $\mu$m or more, a dead space is formed in each of the pixel electrodes 66, in which the liquid crystal molecules M do not tilt according to the electric field in both the reflective type and the transmissive type. Therefore, the width W of the apertures 67 is possibly preferably be 3 $\mu$m or less.

When the width W of the apertures 67 is 3 $\mu$m or less, it is supposed that a sufficient quality of light cannot be obtained for causing the device to function as the transmittive type unless a plurality of apertures 67 are provided according to the size of the pixel electrodes 66. In contrast, when many apertures 67 are provided to increase the total area of the apertures 67, the quantity of transmitted light in the transmmisive type is increased, but a display screen in use as the reflective type is darkened due to a decrease in quality of reflected light corresponding to an increase in quality of transmitted light. It was found by experiment that when the area of the apertures 67 is set to 10 to 25% of the area of the pixel electrodes 66, the transmissive display is well balanced with the reflective display. The area of the pixel electrodes 66 strictly means the area of the intersections of the pixel electrodes and the data lines, i.e., the effective display region not shielded by the black matrix or the like.

Returning to FIG. 1, a plurality of terminal 13a are formed on the projecting portion of the first substrate 7a serving as the element substrate. These terminals are formed at the same time the pixel electrodes 66 are formed on the region of the surface of the first substrate 7a, which is opposed to the second substrate 7b serving as the counter substrate. Also, a plurality of terminal 13b are formed on the projecting portion of the second substrate 7b. These terminals are formed at the same time the data lines 52 are formed on the region of the surface of the second substrate 7b, which is opposed to the first substrate 7a.

Each of the FPC 3a and FPC 3b comprises a flexible base layer made of polyimide or another material, and a metal film pattern formed on the base layer. A plurality of terminals 22 are provided at a side end of the FPC 3b, and are conductively connected to the terminals 13b of the second substrate 7b with a conductive adhesive element such as ACF or the like. A plurality of terminals 23 formed at another side end of the FPC 3b are connected to terminals (not shown) provided at an appropriate position of the control substrate 5.

On the other hand, in the FPC 3a, a plurality of panel side terminals 14 are formed on the back (the lower side shown in FIG. 1) at the side end on the liquid crystal panel 2 side, and a plurality of control substrate side terminals 16 are formed on the surface (the upper side shown in FIG. 1) at the side end opposite to the liquid crystal panel 2 side. Also, a wiring pattern 18 is appropriately formed over a wide range of the surface of the FPC 3a so that one end of the wiring pattern 18 is connected directly to the control substrate side terminals 16, and the other end is connected to the panel side terminals 14 via through holes 19.

Figure 7A:
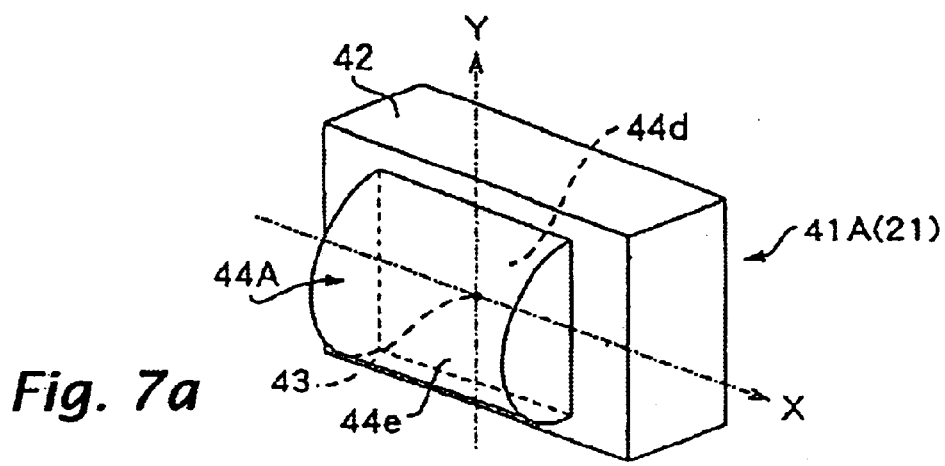
FIG. 7 is a perspective view showing light source devices in accordance with embodiments of the present invention.

The light source devices 21 which constitute an illumination device in cooperation with the light guide 4 are mounted at appropriate intervals on a line on the back of the FPC 3a, i.e., the side opposite to the wiring pattern 18 side. Wiring for these light source devices 21 is connected to the control substrate side terminals 16 via, for example, through holes. The light emitting surface of each of the light source devices 21, i.e., the side on which the lens 44a shown in FIG. 7(a) is formed, is arranged to face in the direction shown by arrow B in FIG. 1, i.e., the direction away from the FPC 3a.

A diffusion plate 27 is mounted to the liquid crystal panel 2 side surface of the light guide 4 by adhesion or the like, and a reflection plate 28 is mounted to the surface of the light guide 4, which is opposite to the liquid crystal panel 2 side, by adhesion or the like. The reflection plate 28 reflects the light received by the light receiving plane 4a of the light guide 4 to the liquid crystal panel 2. The diffusion plate 28 diffuses the light exiting from the light guide 4 to the liquid crystal panel 2 so that the strength is uniform in a plane.

As shown in FIG. 2, the light guide 4 is mounted to the non-display side of the liquid crystal panel 2 with a buffer 32 made of rubber, plastic, or the like and provided therebetween. The control substrate 5 is provided on the side of the light guide 4, which is opposite to the side on which the reflection plate 28 is mounted. The control substrate 5 is mounted as a component of the liquid crystal device 1 to the non-display side surface of the light guide in some case, or mounted as a component of an electronic apparatus using the liquid crystal device 1 in some cases. Furthermore, terminals 33 are formed at a side end of the control substrate 5, for connection with external circuits.

In assembling the components of the liquid crystal device 1 shown in an exploded state in FIG. 1, as shown in FIG. 2, the liquid crystal panel 2 side end of the FPC 3a is bonded to the projecting portion of the first substrate 7a with ACF 34. This bonding causes conductive connection of the terminals 13a of the first substrate 7a and the terminals 14 of the FPC 3a through the conductive particles contained in the ACF 34. Then, the FPC 3a is bent along the light receiving plane 4a of the light guide 4, and the side end of the FPC 3a in the bent state is overlapped with the side end of the control substrate 5. The terminals 16 on the FPC 3a are connected to the terminals 33 on the control substrate 5 by soldering or another conductive connection method.

In bending the FPC 3a for conductive connection, as described above, the light emitting planes of the plurality of light source devices 21 mounted on the surface of the FPC 3a, i.e., the planes on each of which the lens 44a is provided, are arranged to face the light receiving surface 4a of the light guide 4. In this way, the light source devices 21 are arranged to face the light receiving surface 4a of the light guide 4 to form the illumination device for supplying light to the liquid crystal panel 2. Similarly, in the other FPC 3b shown in FIG. 1, the side end where the terminals 23 are formed is conductively connected to the terminals formed at the appropriate portion of the control substrate 5.

Figure 8:
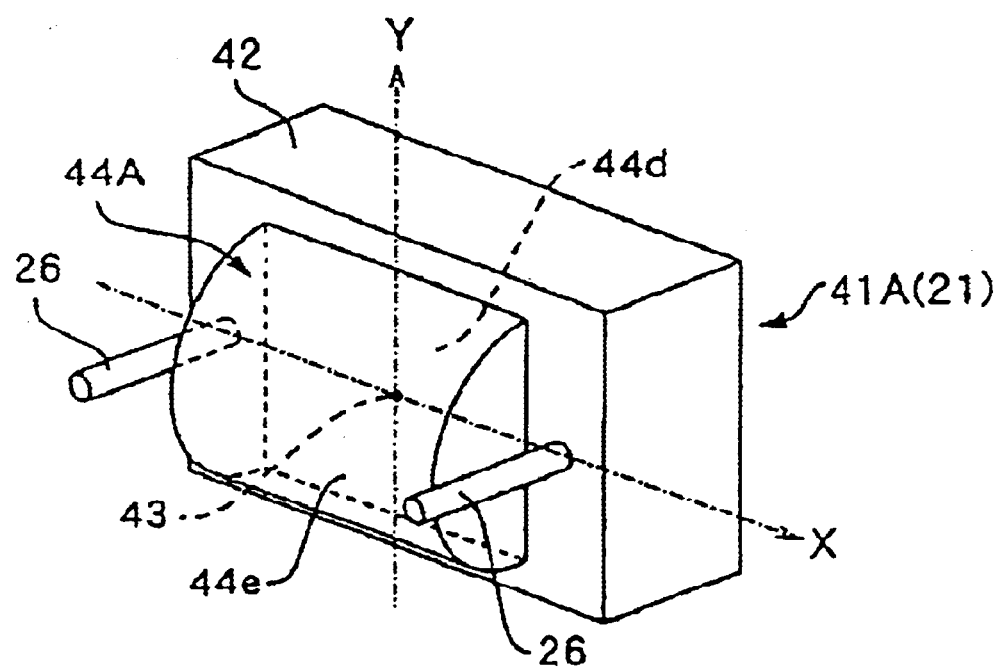
FIG. 8 is a perspective view showing a light source device in accordance with another embodiment of the present invention.

When the positions of the light source devices 21 relative to the light receiving plane 4a are desired to be precisely determined, appropriate positioning means is preferably provided for positioning the light source devices 21 relative to the light guide 4. As a conceivable example of such positioning means, as shown in FIG. 8, a plurality of positioning pins 26 are preferably provided at appropriate positions of the base 42, and recesses are provided at the positions of the light receiving plane 4a of the light guide 4 corresponding to the pins 26 so that the pins 26 can be tightly contained in the recesses. When the light source devices 21 are arranged opposite to the light receiving plane 4a of the light guide 4, the pins 26 are engaged in the recesses to position the light source devices 21.

In this embodiment, the X direction in which the light exiting from the light source device 41A shown in FIG. 7(a) has no directivity coincides with the width direction X of the light guide 4 shown in FIG. 1, and the Y direction in which the light exiting from the light source device 41A shown in FIG. 7(a) has high directivity coincides with the height direction Y of the light guide 4 shown in FIG. 1.

In the liquid crystal device 1 constructed as described above, when the LED 43 shown in FIG. 2 and serving as the light emitting device emits light, the light passes through the lens 44A and is supplied to the inside of the light guide 4 through the light receiving plane 4a. At this time, since the directivity of the light exiting from the light source device 21 is set to be high in the height direction (i.e., the Y direction) of the light guide 4 in which the dimension of the light receiving plane 4a is small, the light from the light source device 21 can be condensed and incident on the light guide 4 as much as possible. Therefore, the efficiency of incidence of light on the light guide 4 can be improved. On the other hand, the directivity of the exiting light is set to be low in the width direction (i.e., the X direction) of the light guide 4 in which the dimension of the light receiving plane 4a is large, so that the light is scattered, whereby uniformity of intensity of light can be achieved.

The light incident on the light guide 4 is reflected by the reflection plate 28, travels to the liquid crystal panel 2, and then supplied to the liquid crystal panel 2 after it is diffused by the diffusion plate 27 so that the intensity is uniform in a plane. The component of the supplied light, which is transmitted through the polarizer plate 12a on the guide plate side is supplied to the liquid crystal layer, and modulated for each pixel by the liquid crystal with the orientation controlled for each pixel according to the change in the voltage applied between the pixel electrodes 66 and the data lines 52. Furthermore, the modulated light is transmitted through the display side polarizer plate 12b to display an image on the outside.

In the illumination device used in the liquid crystal device 1 of this embodiment, the light exiting from the light source device has directivity in the height direction of the light guide in which the dimension is small, and the light exiting from the light source device has no directivity in the width direction of the light guide in which the dimension is large so that the light exiting from the light source device 21 can be efficiently received by the light guide 4. As a result, light with high strength can be caused to exit from the light exiting plane of the light guide 4, i.e., the plane on which the diffusion plate 27 is provided, with uniformity in a planar matter. Therefore, a bright, clear image can be displayed in the display region of the liquid crystal panel 2.

In this embodiment, as shown in FIG. 1, the light source devices 21 are mounted to the same plane of the FPC 3a as the terminals 14 provided on the liquid crystal panel 2 side, and the wiring pattern 18 of the FPC 3a is provided on the side opposite to the light source device 21 side so that it is connected to the terminals 14 through the through holes 19. However, the light source devices 21 may be mounted on the same plane as the wiring pattern 18 in place of the above construction.

Although, in this embodiment, as shown in FIG. 2, the light source devices 21 are supported by the FPC 3a comprising a flexible substrate, the light source devices 21 can be supported by a non-flexible substrate such as an epoxy resin substrate in place of the flexible substrate. In this case, by positioning the non-flexible substrate relative to the light guide 4, the light source devices 21 can be positioned relatively to the light receiving plane 41 of the light guide 4.

Although, in this embodiment, the present invention is applied to an active matrix system transflective liquid crystal device using TFDs, the present invention can also be applied to other various system liquid crystal devices, for example, a reflective liquid crystal device, a transmissive liquid crystal device, an active matrix system liquid crystal device using switching elements other than TFD, a passive matrix system liquid crystal device without using switching elements, etc.

Figure 7B:
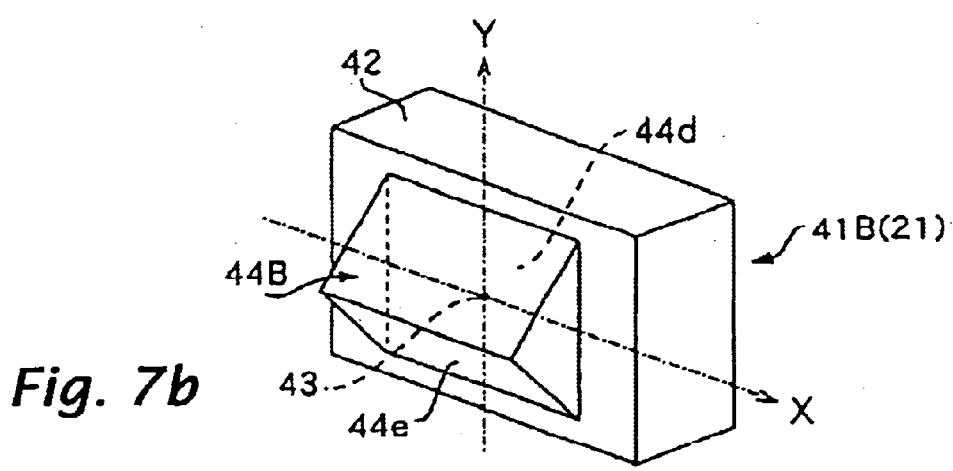
Figure 7C:
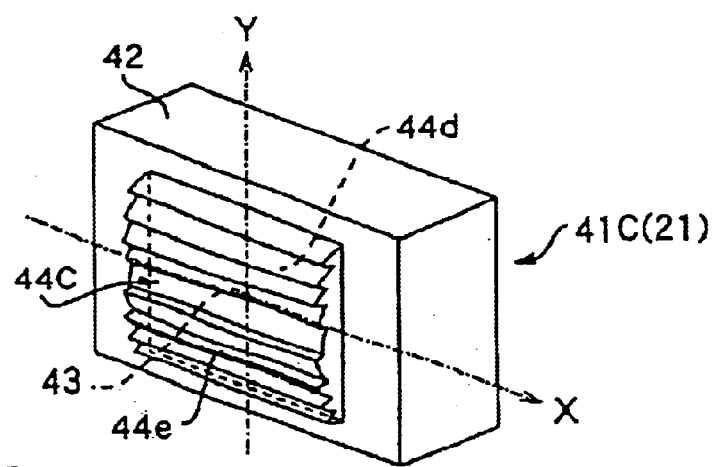

Although this embodiment uses the light source device 41A shown in FIG. 7(a) as each of the light source devices 21, of course, the light source device 41B shown in FIG. 7(b) and the light source device 41C shown in FIG. 7(c) can also be used. Of course, the positioning pins 26 shown in FIG. 8 can be provided on each of the light source devices 41B and 41C so that each of the light source devices 41B and 41C can be positioned relative to the light guide 4.

Figure 9:
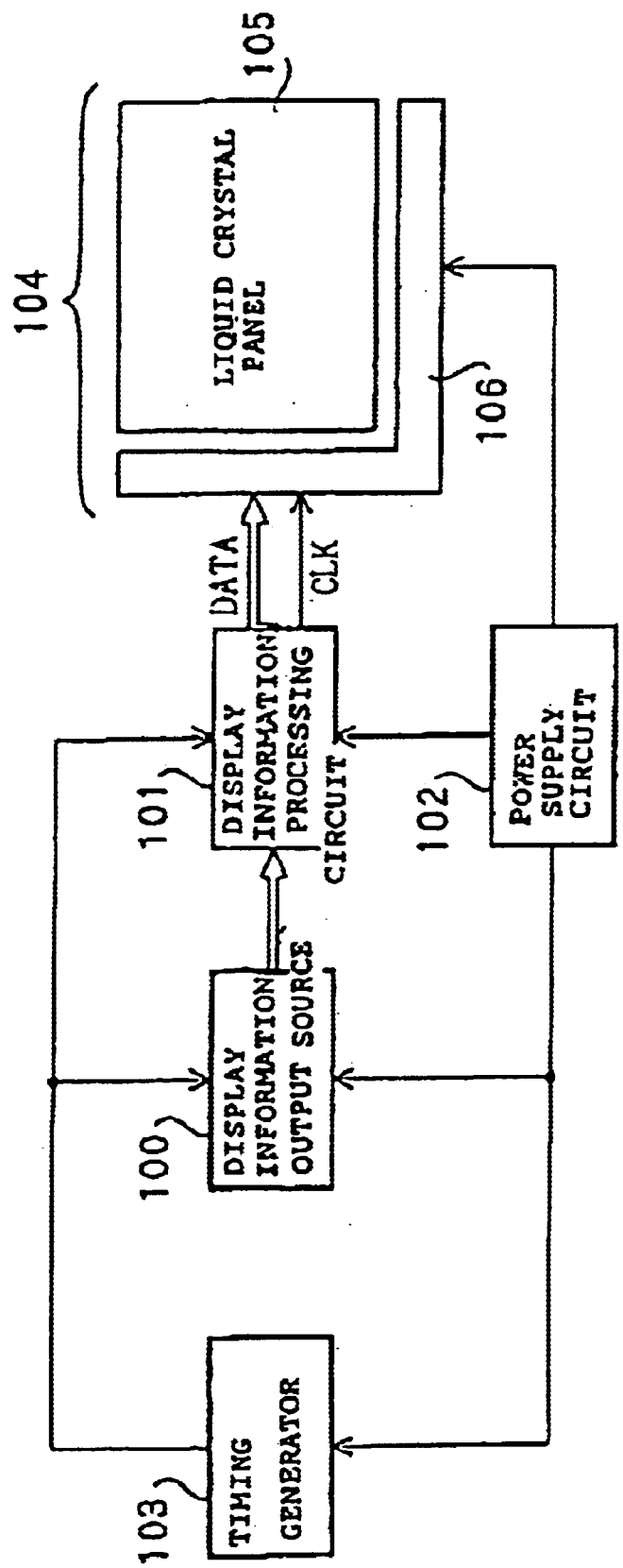
FIG. 9 is a block diagram showing the display control system of an electronic apparatus in accordance with an embodiment of the present invention.

FIG. 9 shows an embodiment in which the liquid crystal device of the present invention is used as a display device of one of various electronic apparatuses. The electronic apparatus shown in FIG. 9 comprises a display information output source 100, a display information processing circuit 101, a power supply circuit 102, a timing generator 103, and a liquid crystal device 104. The liquid crystal device 104 comprises a liquid crystal panel 105 and a driving circuit 106. The liquid crystal device 1 shown in FIG. 1 can be used as the liquid crystal device 104, and the liquid crystal panel 2 shown in FIG. 1 can be used as the liquid crystal panel 105.

The display information output source 100 comprises memory such as ROM (Read Only Memory), or RAM (Random Access Memory), a storage unit such as any of various disks, a tuning circuit for tuning and outputting digital image signals, etc. and supplies display information such as an image signal in a predetermined format to the display information processing circuit 101 based on any of the various clock signals generated by the timing generator 103.

The display information processing circuit 101 comprises various known circuits such as a serial-parallel conversion circuit, an amplification-inversion circuit, a rotation circuit, gamma correction circuit, a clamp circuit, etc. and executes processing of the input information to supply the image signal to the driving circuit 106 together with the clock signal CLK. The driving circuit 106 is a general term for the scanning line driving circuit 57 and the data line driving circuit 58 shown in FIG. 3, an inspection circuit, and the like. The power supply circuit 102 supplies predetermined electric power to each of the components.

Figure 10:
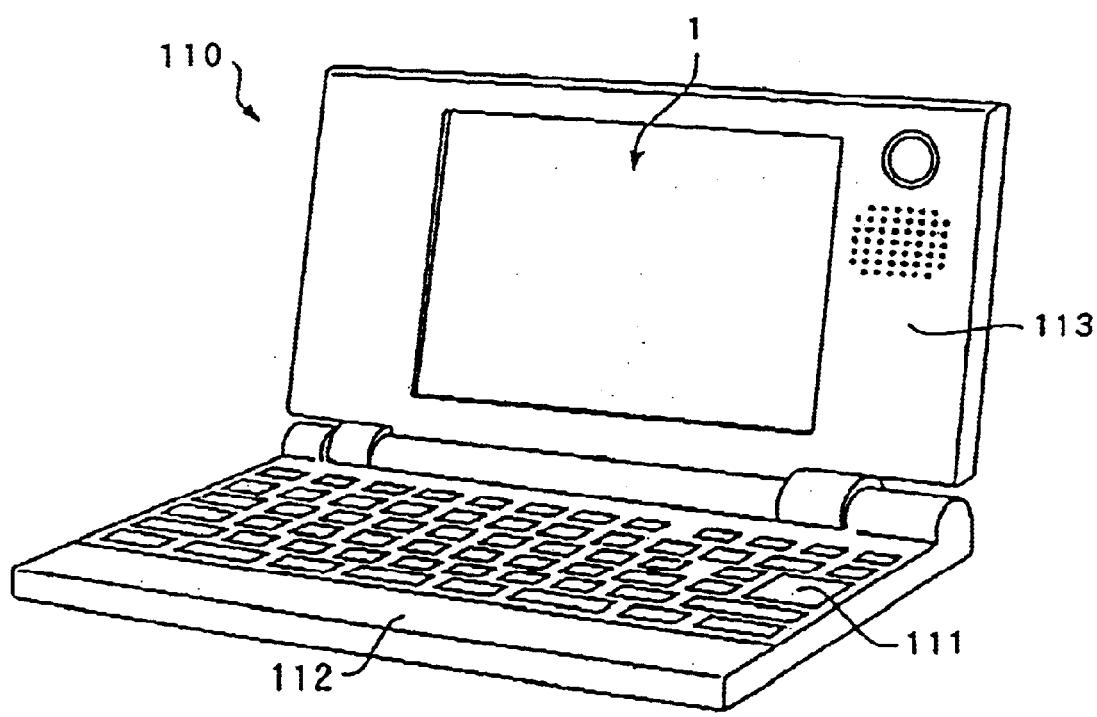
FIG. 10 is a perspective view showing an electronic apparatus in accordance with an embodiment of the present invention.
Figure 11:
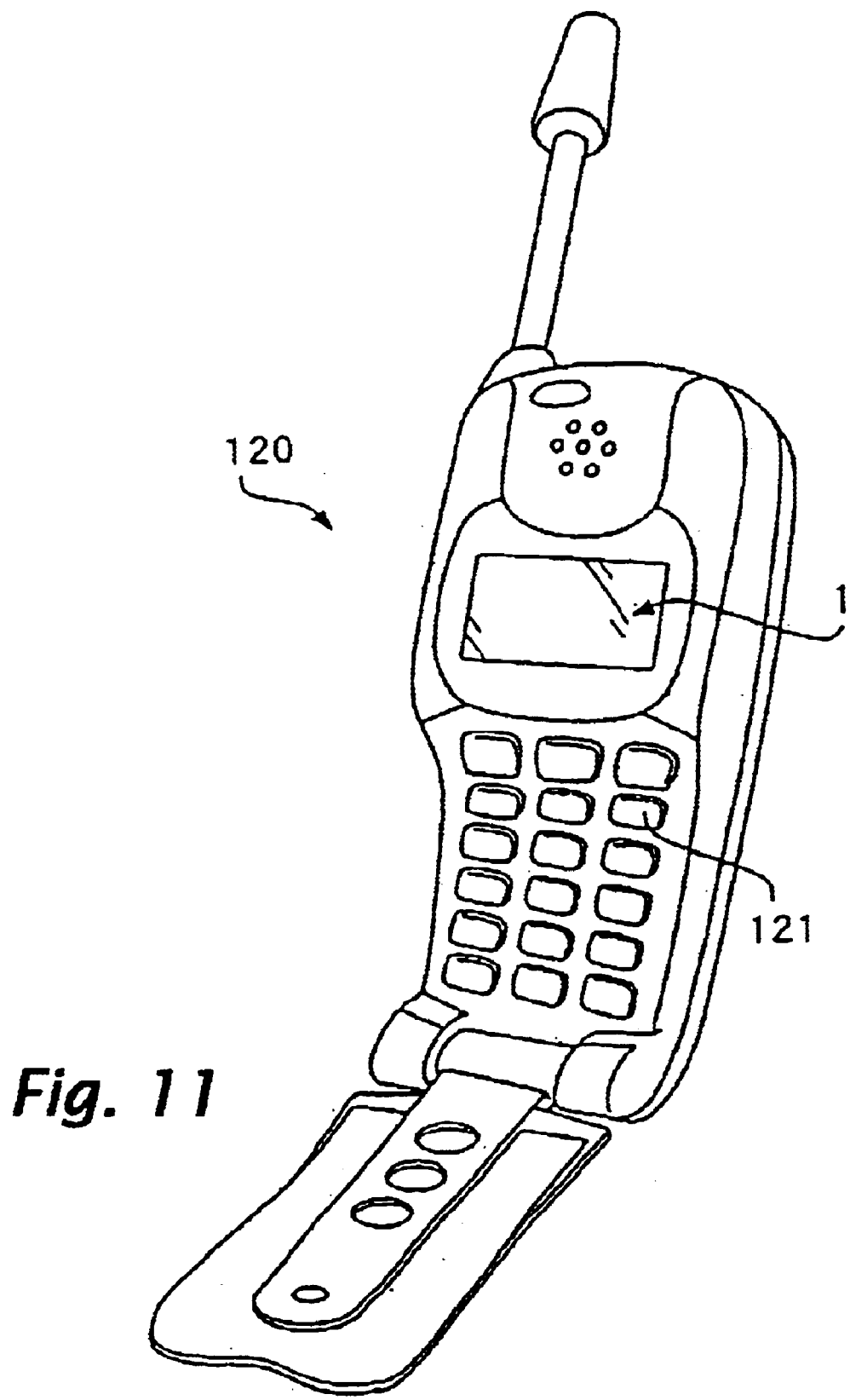
FIG. 11 is a perspective view showing an electronic apparatus in accordance with another embodiment of the present invention.

FIG. 10 shows a mobile personal computer as an electronic apparatus in accordance with an embodiment of the present invention. The personal computer 110 shown in FIG. 10 comprises a body 112 comprising a keyboard 111, and a liquid crystal display unit 113. The liquid crystal display unit 113 comprises the liquid crystal device 1 shown in FIG. 1. FIG. 11 shows a cell phone as an electronic apparatus in accordance with another embodiment of the present invention. The cell phone 120 shown in FIG. 11 comprises a plurality of operating buttons 121 and a liquid crystal device 1.

The liquid crystal device 1 used in the embodiment shown in each of FIGS. 10 and 11 is a transflective liquid crystal device, as described above with reference to FIG. 1. Therefore, even when the computer or cell phone is placed in a portion where external light is insufficient, a display can be seen without any trouble by lighting the illumination device, i.e., a back light, comprising the light source device and the light guide 4.

As described above, a light source device of the present invention has the property that by virtue of a lens provided on a light emitting plane of a light emitting device, exiting light has high directivity in one direction, and low directivity in the direction perpendicular to the one direction. Namely, light with high strength is emitted in a limited narrow range in the one direction, and light is scattered all around at any wide angle in the direction perpendicular to the one direction. Therefore, the one direction and the perpendicular direction are appropriately set according to the shape of an object to which light is supplied, to suppress ineffective travel of light to a portion other than the object. As a result, light can be efficiently incident on the object.

In an illumination device of the present invention, the directivity of the light exiting from a light source device is set to be high in the height direction of a light guide in which the dimension of a light receiving plane is small, so that the light from the light source device can be incident on the light guide as much as possible, thereby improving the efficiency of incidence of light on the light guide. Also, the directivity of the light exiting from a light source device is set to be low in the width direction of the light guide in which the dimension of the light receiving plane is large, so that light is scattered, achieving uniformity in luminous intensity.

In the illumination device used in a liquid crystal device and electronic apparatus of the present invention, the efficiency of incidence of light on the light guide can be increased, thereby achieving a bright display easy to see in the display region of the liquid crystal device.

What is claimed is:

1. An illumination device comprising:
   a light source device which emits light; and
   a light guide having a light receiving plane which receives light from the light source device and a light exiting plane which exits the light;
   wherein the light source device comprises a light emitting device and a lens which is provided on a light emitting portion of the light emitting device and facing the light guide so as to condense the light emitted from the light emitting device on the light guide;
   wherein the lens has a property that provides directivity of exiting light in one direction that is higher than directivity of exiting light in a direction perpendicular to the one direction, the one direction being set to a height direction of the light guide, and the perpendicular direction being set to a width direction of the light guide, the lens having a constant cross-section along a first axis thereof and a varying cross-section along a second axis thereof, the second axis being perpendicular to the first axis.

2. The illumination device according to claim 1, wherein the lens has a planar light incidence plane and a non-planar light exiting plane having a shape in which a height from the light incidence plane changes in one direction, while a height from the light incident plane is constant in a direction perpendicular to the one direction, the one direction being set to a height direction of the light guide, and the perpendicular direction being set to a width direction of the light guide, the lens having a constant cross-section along a first axis thereof and a varying cross-section along a second axis thereof, the second axis being perpendicular to the first axis.

3. The illumination source devices according to claim 1, wherein the lens has any one of a semicircular pillar shape, a prismatic shape, or a partial circular pillar shape having a Fresnel lens surface.

4. The illumination device according to claim 1, wherein the lens is provided adjacent the light receiving plane of the light guide, for condensing light.

5. A liquid crystal device comprising:
   a liquid crystal panel comprising a liquid crystal held between a pair of substrates; and
   an illumination device for supplying light to the liquid crystal panel;
   wherein the illumination device comprises a light source device which emits light, and a light guide having a light receiving plane which receives light from the light source device and a light exiting plane which exits the light; and
   the light source device comprises a light emitting device and a lens which is provided on a light emitting portion of the light emitting device and facing the light guide so as to condense the light emitted from the light emitting device on the light guide;
   wherein the lens has a property that provides directivity of exiting light in one direction that is higher than directivity of exiting light in a direction perpendicular to the one direction, the one direction in which the exiting light has higher directivity being set to a height direction of the light guide, and the perpendicular direction in which the exiting light has lower directivity being set to a width direction of the light guide, the lens having a constant cross-section along a first axis thereof and a varying cross-section along a second axis thereof, the second axis being perpendicular to the first axis.

6. The liquid crystal device according to claim 5, wherein the lens has a planar light incidence plane and a non-planar light exiting plane having a shape in which a height from the light incidence plane changes in one direction, while a height from the light incidence plane is constant in a direction perpendicular to the one direction, the one direction being set to a height direction of the light guide, and the perpendicular direction being set to a width direction of the light guide, the lens having a constant cross-section along a first axis thereof and a varying cross-section along a second axis thereof, the second axis being perpendicular to the first axis.

7. The liquid crystal device according to claim 5, wherein the lens has any one of a semicircular pillar shape, a prismatic shape, or a partial circular pillar shape having a Fresnel lens surface.

8. The liquid crystal device according to claim 5, wherein the lens is provided adjacent the light receiving plane of the light guide, for condensing light.

9. An electronic apparatus comprising a liquid crystal device, and a control circuit for controlling operation of the liquid crystal device, wherein the liquid crystal device comprises a liquid crystal device according claim 5.

10. The illumination source devices according to claim 2, wherein the lens has any one of a semicircular pillar shape, a prismatic shape, or a partial circular pillar shape having a Fresnel lens surface.

11. The illumination device according to claim 2, wherein the lens is provided adjacent the light receiving plane of the light guide, for condensing light.

12. The liquid crystal device according to claim 6, wherein the lens has any one of a semicircular pillar shape, a prismatic shape, or a partial circular pillar shape having a Fresnel lens surface.

13. The liquid crystal device according to claim 6, wherein the lens is provided adjacent the light receiving plane of the light guide, for condensing light.

14. An electronic apparatus comprising a liquid crystal device, and a control circuit for controlling operation of the liquid crystal device, wherein the liquid crystal device comprises a liquid crystal device according claim 6.

15. A light source device comprising:
   a base;
   a light emitting device provided on a surface of the base;
   a lens provided on a light emitting plane of the light emitting device and having a property that provides directivity of exiting light in one direction that is higher than directivity of exiting light in a direction perpendicular to the one direction; and
   positioning means provided for precisely positioning the light source device relative to an object to which light emitted from the light emitting device is supplied.

16. A light source device comprising:
   a base;
   a light emitting device provided on a surface of the base;

a lens provided on a light emitting plane of the light emitting device and having a property that provides directivity of exiting light in one direction that is higher than directivity of exiting light in a direction perpendicular to the one direction; and a plurality of positioning pins provided at predetermined positions of the base so as to precisely position the light source device relative to an object to which light emitted from the light emitting device is supplied.

17. The illumination device according to claim 1 wherein the illumination device comprises a lens which is provided on the light receiving plane of the light guide.

18. The illumination device according to claim 5 wherein the illumination device comprises a lens which is provided on the light receiving plane of the light guide.

19. A liquid crystal device comprising:

a liquid crystal panel comprising a liquid crystal held between a pair of substrates; and an illumination device for supplying light to the liquid crystal panel;

wherein the illumination device comprises a light source device which emits light, and a light guide having a light receiving plane which receives light from the light source device and a light exiting plane which exits the light; and the light source device comprises a light emitting device and a prismatic shaped lens facing the light guide so as to condense the light emitted from the light emitting device on the light guide;

wherein the lens has a property that provides directivity of exiting light in one direction that is higher than directivity of exiting light in a direction perpendicular to the one direction, the one direction in which the exiting light has higher directivity being set to a height direction of the light guide, and the perpendicular direction in which the exiting light has lower directivity being set to a width direction of the light guide, the tens having a constant cross-section along a first axis thereof and a varying cross-section along a second axis thereof, the second axis being perpendicular to the first axis.

20. A liquid crystal device comprising:

a liquid crystal panel comprising a liquid crystal held between a pair of substrates; and an illumination device for supplying light to the liquid crystal panel;

wherein the illumination device comprises a light source device which emits light, and a light guide having a light receiving plane which receives light from the light source device and a light exiting plane which exits the light; and the light source device comprises a light emitting device and a partial circular pillar shaped lens having a Fresnel lens surface which is facing the light guide so as to condense the light emitted from the light emitting device on the light guide;

wherein the lens has a property that provides directivity of exiting light in one direction that is higher than directivity of exiting light in a direction perpendicular to the one direction, the one direction in which the exiting light has higher directivity being set to a height direction of the light guide, and the perpendicular direction in which the exiting light has lower directivity being set to a width direction of the light guide, the lens having a constant cross-section along a first axis thereof and a varying cross-section along a second axis thereof, the second axis being perpendicular to the first axis.

* * * * *